United States Patent
Jung

(10) Patent No.: US 10,553,219 B2
(45) Date of Patent: Feb. 4, 2020

(54) VOICE RECOGNITION APPARATUS, VOICE RECOGNITION METHOD OF USER DEVICE, AND NON-TRANSITORY COMPUTER READABLE RECORDING MEDIUM

(71) Applicant: SAMSUNG ELECTRONICS CO., LTD., Suwon-si (KR)

(72) Inventor: Chi-sang Jung, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 15/213,599

(22) Filed: Jul. 19, 2016

(65) Prior Publication Data
US 2017/0084278 A1  Mar. 23, 2017

(30) Foreign Application Priority Data
Sep. 23, 2015 (KR) ........................ 10-2015-0134696

(51) Int. Cl.
*G10L 17/00* (2013.01)
*G10L 17/22* (2013.01)
(Continued)

(52) U.S. Cl.
CPC ............. *G10L 17/22* (2013.01); *G10L 15/01* (2013.01); *G10L 15/22* (2013.01); *G10L 15/30* (2013.01); *G10L 17/02* (2013.01); *G10L 17/08* (2013.01)

(58) Field of Classification Search
CPC ......... G10L 17/00; G10L 17/04; G10L 17/06; G10L 17/08; G10L 17/14; G10L 17/22; G10L 17/26
(Continued)

(56) References Cited

U.S. PATENT DOCUMENTS

| 5,956,678 A | 9/1999 | Hab-Umbach et al. |
| 7,536,301 B2 | 5/2009 | Jaklitsch et al. |

(Continued)

FOREIGN PATENT DOCUMENTS

| EP | 0671043 B1 | 6/1999 |
| JP | 05-265484 A | 10/1993 |

(Continued)

OTHER PUBLICATIONS

Communication dated Dec. 30, 2016 issued by the International Searching Authority in International Patent Application No. PCT/KR2016/009429 (PCT/ISA/210).

(Continued)

*Primary Examiner* — Qi Han
(74) *Attorney, Agent, or Firm* — Sughrue Mion, PLLC

(57) ABSTRACT

A voice recognition apparatus, a voice recognition method, and a non-transitory computer readable recording medium are provided. The voice recognition apparatus includes a storage configured to store a preset threshold value for voice recognition; a voice receiver configured to receive a voice signal of an uttered voice; and a voice recognition processor configured to recognize a voice recognition starting word from the received voice signal, perform the voice recognition on the voice signal in response to a similarity score, which represents a recognition result of the recognized voice recognition starting word, being greater than or equal to the stored preset threshold value, and change the preset threshold value based on the recognition result of the voice recognition starting word.

9 Claims, 14 Drawing Sheets

(51) Int. Cl.
*G10L 15/01* (2013.01)
*G10L 17/02* (2013.01)
*G10L 15/30* (2013.01)
*G10L 17/08* (2013.01)
*G10L 15/22* (2006.01)

(58) Field of Classification Search
USPC ............... 704/246, 249, 250, 270.1, 275
See application file for complete search history.

(56) References Cited

U.S. PATENT DOCUMENTS

| | | | |
|---|---|---|---|
| 8,386,250 | B2 | 2/2013 | Lloyd et al. |
| 8,688,450 | B2 | 4/2014 | Lloyd et al. |
| 8,694,313 | B2 | 4/2014 | Lloyd et al. |
| 8,990,079 | B1 | 3/2015 | Newman |
| 9,043,205 | B2 | 5/2015 | Mengibar et al. |
| 9,047,863 | B2 | 6/2015 | Krishnan et al. |
| 9,053,702 | B2 | 6/2015 | Rajendran et al. |
| 9,251,251 | B2 | 2/2016 | Mengibar et al. |
| 2004/0215458 | A1* | 10/2004 | Kobayashi ............ G10L 15/06 704/251 |
| 2011/0208525 | A1 | 8/2011 | Inoue et al. |
| 2011/0288868 | A1 | 11/2011 | Lloyd et al. |
| 2012/0022874 | A1 | 1/2012 | Lloyd et al. |
| 2012/0278076 | A1 | 11/2012 | Lloyd et al. |
| 2013/0185062 | A1 | 7/2013 | Krishnan et al. |
| 2013/0185084 | A1 | 7/2013 | Rajendran et al. |
| 2013/0346077 | A1 | 12/2013 | Mengibar et al. |
| 2014/0278389 | A1* | 9/2014 | Zurek ................ G10L 15/20 704/231 |
| 2015/0039303 | A1* | 2/2015 | Lesso ................ G10L 15/28 704/233 |
| 2015/0039305 | A1 | 2/2015 | Huang |
| 2015/0039311 | A1* | 2/2015 | Clark ................ G10L 15/063 704/244 |
| 2015/0112673 | A1 | 4/2015 | Nandy et al. |
| 2015/0254334 | A1 | 9/2015 | Mengibar et al. |

FOREIGN PATENT DOCUMENTS

| | | |
|---|---|---|
| JP | 2000-047691 A | 2/2000 |
| JP | 3079006 B2 | 8/2000 |
| JP | 2002-258882 A | 9/2002 |
| JP | 2008-009153 A | 1/2008 |
| KR | 10-1998-0068453 A | 10/1998 |
| KR | 10-0766061 B1 | 10/2007 |
| KR | 10-2008-0035754 A | 4/2008 |
| KR | 10-0819848 B1 | 4/2008 |
| KR | 10-1065188 B1 | 9/2011 |
| KR | 10-1214252 B1 | 12/2012 |
| KR | 10-2013-0113307 A | 10/2013 |
| KR | 10-1330328 B1 | 11/2013 |
| KR | 10-2014-0119735 A | 10/2014 |
| KR | 10-2015-0031309 A | 3/2015 |

OTHER PUBLICATIONS

Communication dated Dec. 30, 2016 issued by the International Searching Authority in International Patent Application No. PCT/KR2016/009429 (PCT/ISA/237).

* cited by examiner

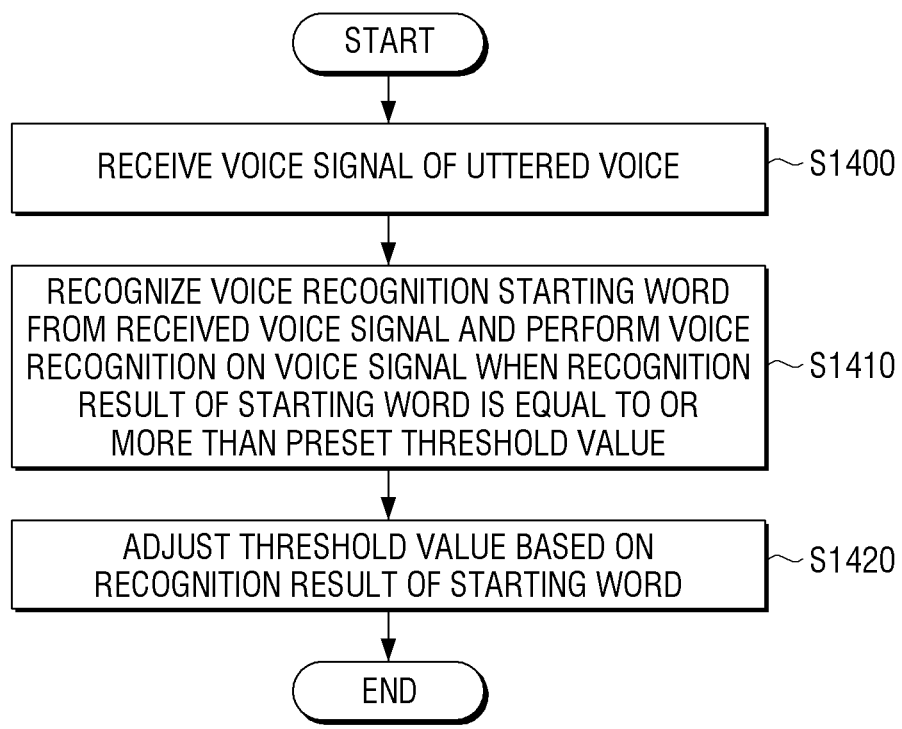

VOICE RECOGNITION APPARATUS, VOICE
RECOGNITION METHOD OF USER
DEVICE, AND NON-TRANSITORY
COMPUTER READABLE RECORDING
MEDIUM

CROSS-REFERENCE TO RELATED APPLICATION

This application claims priority from Korean Patent Application No. 10-2015-0134696, filed on Sep. 23, 2015 in the Korean Intellectual Property Office, the disclosure of which is incorporated herein by reference in its entirety.

BACKGROUND

Field

Apparatuses and methods consistent with exemplary embodiments relate to an adaptive voice recognition performed by a user device according to an environment in which the user device is actually used.

Description of the Related Art

A trigger recognizer is a type of isolated word voice recognizer that activates a voice recognizer using a fixed word. A user transmits expression of activation of voice recognition to a voice recognition apparatus through trigger recognition. In other words, a trigger recognizer activates a voice recognizer through voice instead of a button or an input device. Accordingly, the trigger recognizer always receives a sound input to a microphone as an input and determines whether an input considered as voice is a trigger word to determine whether the voice recognizer is activated. In this case, the trigger recognizer determines whether input speech is a trigger word using a threshold value of similarity. The threshold value plays an important role in order to prevent a malfunction due to misrecognition of the trigger recognizer. In addition, the trigger recognizer may determine a recognition result using a fixed threshold value via learning about a predefined word.

However, since an environment in which a trigger recognizer is actually used is variably changed, when a conventional fixed threshold value is used, the trigger recognizer causes trigger misrecognition due to the changed user and use environment, thereby reducing a recognition rate.

SUMMARY

Exemplary embodiments address at least the above disadvantages and other disadvantages not described above. Also, the exemplary embodiments are not required to overcome the disadvantages described above, and may not overcome any of the problems described above.

One or more exemplary embodiments provide a voice recognition apparatus, a voice recognition method, and a computer readable recording medium, for adaptively performing voice recognition by, for example, a user device for voice recognition according to an environment in which the user device is actually used.

According to an aspect of an exemplary embodiment, there is provided a voice recognition apparatus including: a storage configured to store a preset threshold value used for voice recognition, a voice receiver configured to receive a voice signal of an uttered voice, and a voice recognition processor configured to recognize a voice recognition starting word from the received voice signal and to perform the voice recognition on the voice signal when a similarity score as a recognition result of the recognized voice recognition starting word is greater than or equal to the stored preset threshold value, wherein the voice recognition processor changes the preset threshold value based on the recognition result of the voice recognition starting word.

The voice recognition processor may recognize the voice recognition starting word and change a preset threshold value to be compared with a similarity score related to a generated text-based recognition result The voice recognition processor may change the preset threshold value when the text-based recognition result of the voice signal is detected a preset number of times or more.

The voice recognition processor may change the preset threshold value when a misrecognition rate is increased as a result of the voice recognition using the preset threshold value The voice recognition apparatus may further include a storage configured to store a successful recognition result as a speaker model of a user when recognition is successful as a result of the voice recognition based on the changed preset threshold value, and to store a failed recognition result as a background model of an environment to which the user belongs when recognition fails, wherein the voice recognition processor may re-change the changed preset threshold value based on a recognition result of the speaker model and a recognition result of the background model when an arbitrary condition is satisfied.

The voice recognition processor may re-change the changed preset threshold value when a misrecognition rate is increased as a result of the voice recognition based on the changed preset threshold value.

The voice recognition apparatus may further include an isolated word voice recognizer configured to recognize the voice recognition starting word.

According to an aspect of another exemplary embodiment, there is provided a voice recognition method including: storing a preset threshold value used for voice recognition, receiving a preset threshold value used for voice recognition, recognizing a voice recognition starting word from the received voice signal and performing the voice recognition on the voice signal when a similarity score as a recognition result of the recognized voice recognition starting word is greater than or equal to the stored preset threshold value, and changing the preset threshold value based on the recognition result of the voice recognition starting word.

The changing of the preset threshold value may include recognizing the voice recognition starting word and changing a preset threshold value to be compared with a similarity score related to a generated text-based recognition result.

The changing of the preset threshold value may include changing the preset threshold value when the text-based recognition result of the voice signal is detected a preset number of times or more The changing of the preset threshold value may include changing the preset threshold value when a misrecognition rate is increased as a result of the voice recognition using the preset threshold value.

The voice recognition method may further include storing a successful recognition result as a speaker model of a user when recognition is successful as a result of the voice recognition based on the changed preset threshold value and storing a failed recognition result as a background model of an environment to which the user belongs when recognition fails, and re-changing the changed preset threshold value based on a recognition result of the speaker model and a recognition result of the background model when an arbitrary condition is satisfied.

The re-changing of the changed preset threshold value may include re-changing the changed preset threshold value when a misrecognition rate is increased as a result of the voice recognition based on the changed preset threshold value.

The method may be performed by an isolated word voice recognizer installed in a user device and configured to recognize the voice recognition starting word.

According to an aspect of another exemplary embodiment, a non-transitory computer readable recording medium has recorded thereon a program for executing a voice recognition method, the method including storing a preset threshold value used for voice recognition, receiving a preset threshold value used for voice recognition, recognizing a voice recognition starting word from the received voice signal and performing the voice recognition on the voice signal when a similarity score as a recognition result of the recognized voice recognition starting word is greater than or equal to the stored preset threshold value, and changing the preset threshold value based on the recognition result of the voice recognition starting word.

BRIEF DESCRIPTION OF THE DRAWINGS

The above and/or other aspects will be more apparent by describing certain exemplary embodiments, with reference to the accompanying drawings, in which:

FIG. 14 is a flowchart of a voice recognition procedure according to another exemplary embodiment.

DETAILED DESCRIPTION

Figure 1:
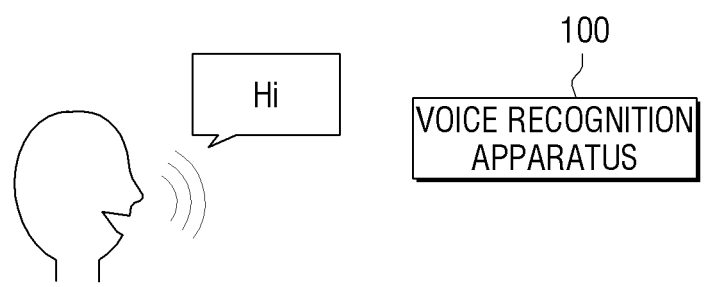
FIG. 1 is a diagram illustrating a voice recognition apparatus according to an exemplary embodiment.

Certain exemplary embodiments will now be described in greater detail with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

FIG. 1 is a diagram illustrating a voice recognition apparatus 100 according to an exemplary embodiment.

As illustrated in FIG. 1, the voice recognition apparatus 100 according to the exemplary embodiment may include a voice recognizer for recognition of external user voice.

The voice recognition apparatus 100 may include an image displaying device such as a television (TV), a cellular phone, a lap-top computer, a desk-top computer, a tablet PC, a plasma display panel (PDP), and an MP3 player and include home appliances such as a refrigerator, a washing machine, a media player such as an audio equipment and a bluray player, and a set-top box.

The voice recognition apparatus 100 may further include an electronic apparatus such as a door lock system or an automobile.

The voice recognition apparatus 100 may receive user voice from an external user. To this end, although the voice recognition apparatus 100 is capable of receiving user voice through a microphone installed therein, the voice recognition apparatus 100 may receive voice received from a noise apparatus connected to a connector in the form of a jack or a universal serial bus (USB) and perform a voice recognition operation. Here, the noise apparatus may refer to a microphone but refer to a separate apparatus as a microphone that stands alone during an operation.

The voice recognition apparatus 100 may perform a voice recognition operation on the received user voice using the voice recognizer embedded, i.e., installed in the voice recognition apparatus 100. Here, the voice recognizer may include a captive firing engine that refers to an isolated word voice recognizer for recognition of a fixed word. A user may transmit an intention for activation of voice recognition to the voice recognition apparatus 100. To this end, the voice recognition apparatus 100 may include a trigger recognizer as a type of an isolated word voice recognizer.

For example, as illustrated in FIG. 1, a user may utter "Hi" as a pre-sequence of voice recognition toward the voice recognition apparatus 100. In greater detail, when the user utters "Hi TV" toward a TV as the voice recognition apparatus 100, the voice recognition apparatus 100 may perform an operation for recognition of only a word "Hi" from the received user voice.

To this end, the voice recognition apparatus 100 may analyze audio data of the received voice to generate a text-based recognition result, for example, a recognition result in the form of a phonetic symbol and compare the generated recognition result with a preset recognition result, that is, a phonetic symbol "Hi" to determine whether recognition is successful. In this case, upon comparing the generated recognition result with a preset recognition result to determine whether recognition is successful, the voice recognition apparatus 100 may calculate a similarity score and determine that recognition is successful when the calculated similarity score exceeds a threshold value.

In general, the threshold value of the similarity score may be determined at the release date of the voice recognition apparatus 100. In other words, the voice recognition apparatus 100 may determine a similarity score, that is, a threshold value, using a significant amount of experimental data that is variously pronounced as "Hi" before release, e.g., in an experimental environment. The determined threshold value may be, for example, stored in a registry from a software point of view or in a memory from a hardware point of view and, in addition, a threshold value (or information) may also be stored in the form of lookup table (LUT). Accordingly, a method of storing a threshold value may not be particularly limited.

However, experimental data used in an experimental environment may be frequently misrecognized in an environment in which the voice recognition apparatus 100 is actually used. For example, even if a user pronounces "Hi", a recognition result may be differently recognized according to a difference in the structure of vocal cords of the user to be determined as misrecognition and noise in a surrounding environment may be recognized as voice such as "Hi". In other words, honk of a surrounding vehicle may be recognized similarly to a voice signal of voice of "Hi", i.e., audio data such that the voice recognition apparatus 100 malfunctions.

The voice recognition apparatus 100 according to an exemplary embodiment may adaptively change a preset recognition result in consideration of such various variables. In other words, a TV released as the voice recognition apparatus 100 is assumed to be installed in any user house. In addition, the user may provide a user command to the TV and request the user house to perform an adaptive voice recognition operation. Needless to say, this procedure may be performed through a UI image display in a screen of the TV or by selecting a specific button of a remote controller.

Then, the voice recognition apparatus 100 may detect a voice signal corresponding to a user command from signals, i.e., sound collected from a house with a TV installed therein for several tens or several periods. In addition, the detected voice signal, i.e., audio data may be analyzed to obtain a recognition result of speaker characteristics. When the recognition result is collected several times, the voice recognition apparatus 100 may adjust (or change) a preset recognition result, and more particularly, a threshold value of a similarity score based on the collected recognition result. Here, the "recognition result" may include preset text-based text information and the threshold value of the similarity score. The voice recognition apparatus 100 according to an exemplary embodiment may adjust the threshold value of the similarity score.

In addition, the adjusted threshold value may be used in a subsequent voice recognition operation. For example, when voice recognition is successful, the voice recognition apparatus 100 may store the successful voice recognition result as a model to which speaker characteristics are applied. For example, it is assumed that a preset-text based recognition result is expressed as binary 8-bit information "10101010". In this case, the recognition result to which the speaker characteristics are applied may be "10101011". This may be stored as a speaker model of an arbitrary user. When the similarity score is adjusted based on the speaker model and then voice recognition is performed, if recognition fails, the failed recognition result may be determined as a background model and stored.

For example, during voice recognition while the similarity score is initially adjusted, the similarity score may need to be frequently readjusted due to a change in user environment. The similarity score may be readjusted at an appropriate moment when a recognition rate is reduced due to the threshold value of the adjusted similarity score. In other words, upon monitoring a recognition state in real time or periodically checking the recognition state and determining that a phenomenon in which a recognition rate of voice recognition is overall degraded is maintained for long time, the voice recognition apparatus 100 may readjust (or rechange) the threshold value of the similarity score.

In this case, the voice recognition apparatus 100 may separately store the collected recognition result of user voice as a speaker model and a background model and then may refer to the collected recognition result during readjustment of the threshold value of the similarity score. In other words, according to an exemplary embodiment, text information of a preset recognition result may be fixed. However, the recognition result, i.e., text information stored as the speaker model and the background model may be deemed to be referred to readjust the threshold value of the similarity score.

In the above manner, the voice recognition apparatus 100 may adaptively operate with respect to a user and a surrounding environment thereof, and more particularly, user voice characteristics and a noise environment other than the voice characteristics so as to prevent misrecognition in an environment of actual use.

Figure 2:
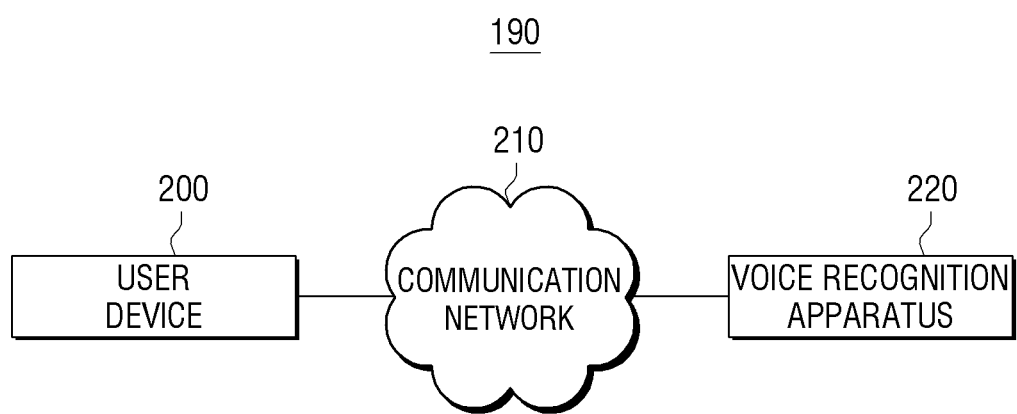
FIG. 2 is a diagram illustrating a voice system according to another exemplary embodiment.

FIG. 2 is a diagram illustrating a voice system 190 according to another exemplary embodiment.

As illustrated in FIG. 2, the voice system 190 according to the exemplary embodiment may include some or all of a user device 200, a communication network 210, and a voice recognition apparatus 220.

Here, inclusion of some or all of components refers to the case in which the communication network 210 is omitted and the voice system 190 is configured. For example, a TV as the user device 200 and a server as the voice recognition apparatus 220, e.g., a computer may directly (ex. P2P) communicate with each other and, thus, the case in which the voice system 190 includes all of the components will be described for sufficient understanding.

As described above, the user device 200 may include an image display device, a home appliance, an electronic device, and so on. In addition, when the user device 200 does not include a voice recognizer therein, the user device 200 may transmit received voice to the voice recognition apparatus 220 in the form of a voice signal, i.e., audio data and receive a recognition result of the voice from the voice recognition apparatus 220. In addition, when the user device 200 includes a voice recognizer, the user device 200 may determine a place in which audio data of the received voice is to be recognized. For example, a simple trigger word such as "Hi TV" may be executed in the user device 200 but a command such as "turn off the TV" or "turn on the TV" to the voice recognition apparatus 220. To this end, the user device 200 may check speech time. In addition, the user device 200 may determine an entity for voice recognition even when load is excessive for an internal operating state, e.g., an operation of a CPU or a state of the communication network 210 is unstable to transmit data to the voice recognition apparatus 220.

In addition, a detailed description related to the user device 200 has been sufficiently described through the voice recognition apparatus 100 of FIG. 1 and, thus, will be omitted below.

The communication network 210 may include both wired and wireless communication networks. Here, the wired network may include the Internet network such as a cable network or a public switched telephone network (PSTN) and the wireless communication network may include CDMA, WCDMA, GSM, evolved packet core (EPC), long term evolution (LTE), and a WiBro network. Needless to say, the communication network 210 according to an exemplary embodiment is not limited thereto and, thus, may be used as an access network of a next-generation mobile communication system to be embodied in the future, for example, in a cloud computing network or the like in a cloud computing environment. For example, when the communication network 210 is a wired communication network, an access point in the communication network 210 may access a switch center of a telephone company, but when the communication network 210 is a wireless communication network, the access point may access an SGSN or a gateway GPRS support node (GGSN) managed by a telecommunication company and process data or may access various relaying devices such as base station transmission (BTS), NodeB, and e-NodeB and process data.

The communication network 210 may include an access point. The access point may include a small base station such as femto or pico base station, which is mainly installed in a building. Here, the femto or pico base station may be differentiated according to a maximum number of user devices 200 that access the base station based on classification of a small base station. Needless to say, the access point may include a local area communication module for local area communication such as ZigBee and Wi-Fi with the user device 200. The access point may use TCP/IP or a real-time streaming protocol (RTSP) for wireless communication. Here, local area communication may be performed according to various standards such as Bluetooth, ZigBee, IrDA, radio frequency (RF) including ultra high frequency (UHF) and very high frequency (VHF), and ultra wideband (UWB) as well as WiFi. Accordingly, the access point may extract a position of a data packet, determine an optimum communication path for the extracted position, and transmit the data packet to a next apparatus, e.g., the user device 200 along the determined communication path. The access point may share a plurality of lines in a general network environment and include, for example, a router, a repeater, a relay, and so on.

The voice recognition apparatus 220 may include a voice recognizing server and may be operated as a type of cloud server. In other words, the voice recognition apparatus 220 may include all HW resources or SW resources related to voice recognition so as to generate and provide a recognition result of audio data received from the user device 200 having minimum resources. Needless to say, the voice recognition apparatus 220 according to an exemplary embodiment is not limited to a cloud server. For example, when the communication network 210 is omitted and the user device 200 directly communicates with the voice recognition apparatus 220, the voice recognition apparatus 220 may be an external device, i.e., an access point or a peripheral device such as a desk-top computer. In addition, the voice recognition apparatus 220 may be any device that is capable of providing only a recognition result of audio data provided by the user device 200. Accordingly, the voice recognition apparatus 220 may be an apparatus for providing a recognition result.

As described above, the voice recognition apparatus 220 of FIG. 2 may be a server as a network-based apparatus. Accordingly, when the user device 200 does not include a voice recognizer, for example, a trigger recognizer for recognizing a trigger word, the voice recognition apparatus 220 may provide a recognition result of the trigger word. It may be sufficient that the recognition result of the trigger word may be "Fail" or "Success". For example, when the recognition result is "Success", the voice recognition apparatus 220 may transmit binary information "1" and the user device 200 may perform a regular voice recognizing operation based on the information. In other words, the trigger recognizer recognizes only a trigger word and, thus, the user device 200 may execute the voice recognizer such as "*-Voice" in order to perform the regular voice recognizing operation.

Figure 3:
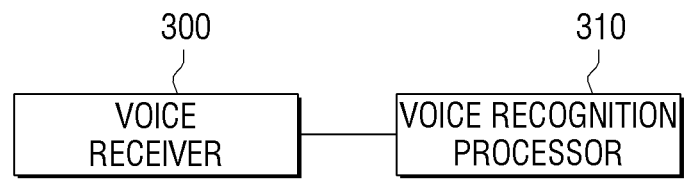
FIG. 3 is a block diagram illustrating an example of a detailed configuration of the voice recognition apparatus of FIG. 1 or the user device of FIG. 2.

FIG. 3 is a block diagram illustrating an example of a detailed configuration of the voice recognition apparatus 100 of FIG. 1 or the user device 200 of FIG. 2.

For convenience of description, with reference to FIG. 3 in addition to FIG. 1, the voice recognition apparatus 100 according to an exemplary embodiment may include some or all of a voice receiver 300 and a voice recognition processor 310.

Here, inclusion of some or all of components refers to the case in which some components such as the voice receiver 300 is omitted and the voice recognition apparatus 100 is configured or may be integrated into another component such as the voice recognition processor 310 and the case in which the voice recognition apparatus 100 includes all of the components will be described for sufficient understanding.

The voice receiver 300 may include a microphone. User voice, i.e., sound energy may be converted in the form of a voice signal, i.e., in the form of electric energy through the microphone and transmitted to the voice recognition processor 310. In addition, the voice receiver 300 may include a connector. When the voice receiver 300 includes a connector, the voice receiver 300 may be connected to a sound pickup device in the form of a separate device connected to a connector such as a jack or a universal serial bus (USB). In this case, it may be deemed that the voice receiver 300 receives a voice signal from the sound pickup device.

The voice recognition processor 310 may be adaptively operated to an environment in which the voice recognition apparatus 100 is actually used. In other words, when there is a separate request from a user or the voice recognition apparatus 100 satisfies a preset condition, the voice recognition processor 310 may be automatically operated to perform this adaptive operation. In other words, the voice recognition processor 310 may analyze user voice collected in an actual environment and change a threshold value of a similarity score of a preset recognition result. Then, when a recognition operation is performed based on the changed threshold value, if recognition is successful, text information may be stored as a speaker model, and when recognition fails, the failed recognition result may be determined as a background environment that the user contacts and the text information may be stored as a background model. Here, the threshold value may be stored in a registry or a memory.

During this operation, as a result of monitoring or periodically checking a recognition rate, when the recognition rate is continuously reduced, the voice recognition processor 310 may determine that there is a problem in the adjusted threshold value of the similarity score. Accordingly, the voice recognition processor 310 may re-analyze speaker characteristics of the received user voice and re-adjust the threshold value by overall considering a speaker model obtained by separately storing the re-analyzed recognition result or text information of the background model.

The voice recognition result processed in this manner may be stored in the voice recognition processor 310. In addition, the stored voice recognition result may be used for system check.

Figure 4:
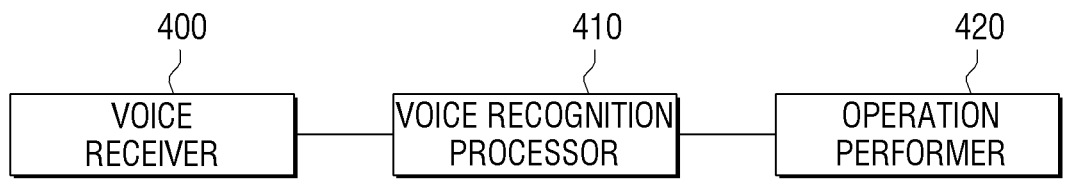
FIG. 4 is a block diagram illustrating an example of a detailed configuration of a voice recognition apparatus of FIG. 1 or a user device of FIG. 2.

FIG. 4 is a block diagram illustrating an example of a detailed configuration of a voice recognition apparatus 100' of FIG. 1 or a user device 200' of FIG. 2.

For convenience of description, with reference to FIG. 4 in addition to FIG. 1, the voice recognition apparatus 100' according to another exemplary embodiment may include some or all of a voice receiver 400, a voice recognition processor 410, and an operation performer 420, and here, inclusion of some or all of components is the same as the aforementioned meaning.

Comparing the voice recognition apparatus 100' of FIG. 4 with the voice recognition apparatus 100 of FIG. 3, the voice recognition apparatus 100' of FIG. 4 is different from the voice recognition apparatus 100 of FIG. 3 in that the voice recognition apparatus 100' of FIG. 4 further includes the operation performer 420.

In other words, the voice recognition processor 310 of FIG. 3 lastly perform an operation of storing a recognition result therein, but the voice recognition processor 410 of FIG. 4 may perform a detailed operation using the recognition result. For example, when recognition of a trigger word is successful, the voice recognition processor 410 may display a user interface (UI) window in order to execute a voice recognizer such as "*-Voice" and to indicate the execution to the user for a regular voice recognition operation. Accordingly, the operation performer 420 may include a display.

In addition, the operation performer 420 may perform a search operation using a voice recognition result, i.e., a text-based recognition result processed by the voice recognition processor 410. For example, when the user utters "How's today's weather?" or a name of the sport star "Ji-sung*", the operation performer 420 may access an external search server and so on and perform the search operation. Accordingly, the operation performer 420 may include a controller, a communication interface, and so on.

Except for this point, the voice receiver 400 and the voice recognition processor 410 of FIG. 4 are not largely different from the voice receiver 300 and the voice recognition processor 310 of FIG. 3 and, thus, the detailed description of the voice receiver 300 and the voice recognition processor 310 will replace those of the voice receiver 400 and the voice recognition processor 410.

Figure 5:
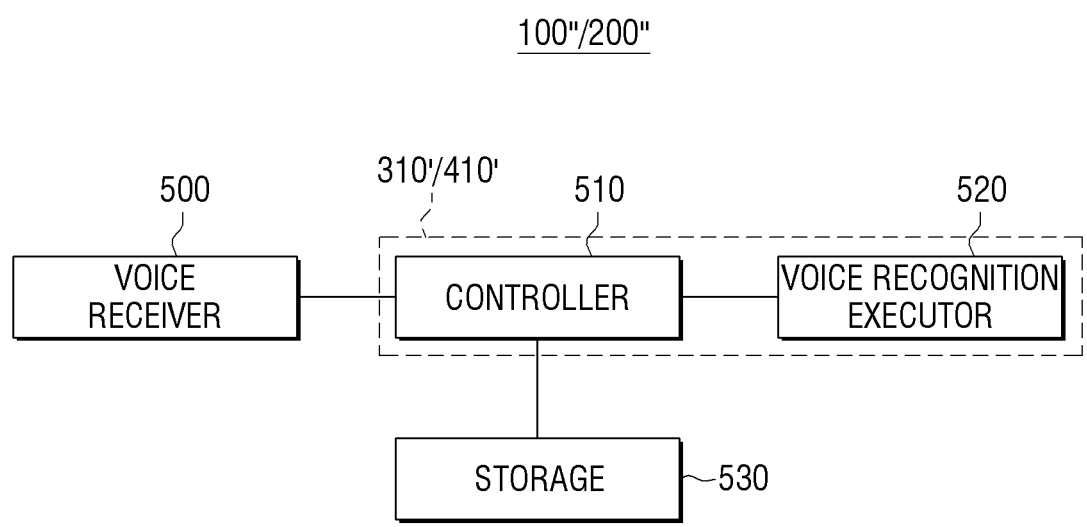
FIG. 5 is a block diagram illustrating another example of a detailed configuration of a voice recognition apparatus of FIG. 1 or a user device of FIG. 2.

FIG. 5 is a block diagram illustrating another example of a detailed configuration of a voice recognition apparatus 100" of FIG. 1 or a user device 200" of FIG. 2.

For convenience of description, with reference to FIG. 5 in addition to FIG. 1, the voice recognition apparatus 100" according to another exemplary embodiment may include some or all of a voice receiver 500, a controller 510, a voice recognition executor 520, and a storage 530 and, here, inclusion of some or all of components is the same as the aforementioned meaning.

Comparing the voice recognition apparatus 100" of FIG. 5 with the voice recognition apparatus 100 of FIG. 3, the voice recognition apparatus 100" of FIG. 5 is different from the voice recognition apparatus 100 of FIG. 3 in that the voice recognition processors 310 and 410 of FIGS. 3 and 4 are each divided into the controller 510 and the voice recognition executor 520.

The controller 510 may overall control components in the voice recognition apparatus 100". For example, in response to audio data of user voice being received through the voice receiver 500, the controller 510 may transmit the audio data to the voice recognition executor 520. In addition, in response to a recognition result being output from the voice recognition executor 520, the controller 510 may perform an operation of storing the recognition result in the storage 530.

The voice recognition executor 520 may include a voice recognizer for voice recognition. The voice recognition executor 520 according to an exemplary embodiment may include a trigger recognizer. In this regard, as described above, the trigger recognizer may be adaptively operated to an environment in which the trigger recognizer is actually used. The adaptive operation to an actual environment has been sufficiently described and, thus, will not be described below.

The voice recognition executor 520 may be operated under control of the controller 510 according to an exemplary embodiment. In other words, the controller 510 may execute a voice recognition engine included in the voice recognition executor 520 to perform a recognition operation and receive a recognition result from the voice recognition executor 520.

The storage 530 may temporally store various information items processed by the controller 510. For example, the storage 530 may temporally store user audio data received by the controller 510 in the storage 530 and, then, may call the stored audio data and provide the audio data to the voice recognition executor 520. In addition, the storage 530 may store a threshold value related to the similarity score and then provide a threshold value stored for a comparison operation to the voice recognition executor 520 under control of the controller 510. It may be possible that the comparison operation is performed by the controller 510 and, thus, the present embodiment is not particularly limited to the above description. In addition, the threshold value stored in the storage 530 may be stored in the form of a lookup table.

In addition, the storage 530 may store speaker model information and background model information processed by the voice recognition executor 520 under control of the controller 510. Here, the speaker model information and the background model information may be a recognition result processed by the voice recognition executor 520, in detail, text-based information, and more particularly, the speaker model information may correspond to successfully recognized information and the background model information may correspond to failed recognition information. These information items may be used to adjust the threshold value of the similarity score of the recognition result as described above.

Figure 6:
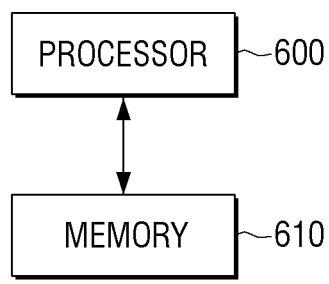
FIG. 6 is a diagram illustrating an example of a configuration of a controller of FIG. 5.

FIG. 6 is a diagram illustrating an example of a configuration of the controller 510 of FIG. 5.

As illustrated in FIG. 6, the controller 510 of FIG. 5 may include some or all of a processor 600 and a memory 610.

The controller 510 of FIG. 5 may include only the processor 600 of FIG. 6 but may further include the memory 610. In other words, the controller 510 of FIG. 5 may control the voice recognition executor 520 to execute a voice recognizer installed therein. On the other hand, when the controller 510 further includes the memory 610, the processor 600 may load and store the voice recognizer included in the voice recognition executor 520 of FIG. 5 in the memory 610 during initial driving of the voice recognition apparatus 100". In addition, when a voice recognition operation needs to be performed, a recognition engine stored in the memory 610 may be executed. Accordingly, data for a recognition operation may be more rapidly processed by as much as this operation. Here, the memory 610 may include a random access memory (RAM). In this case, for example, the recognition engine loaded in the memory 610 may include a preset threshold value or a threshold value may be pre-stored in a determined region of the memory 610.

Figure 7:
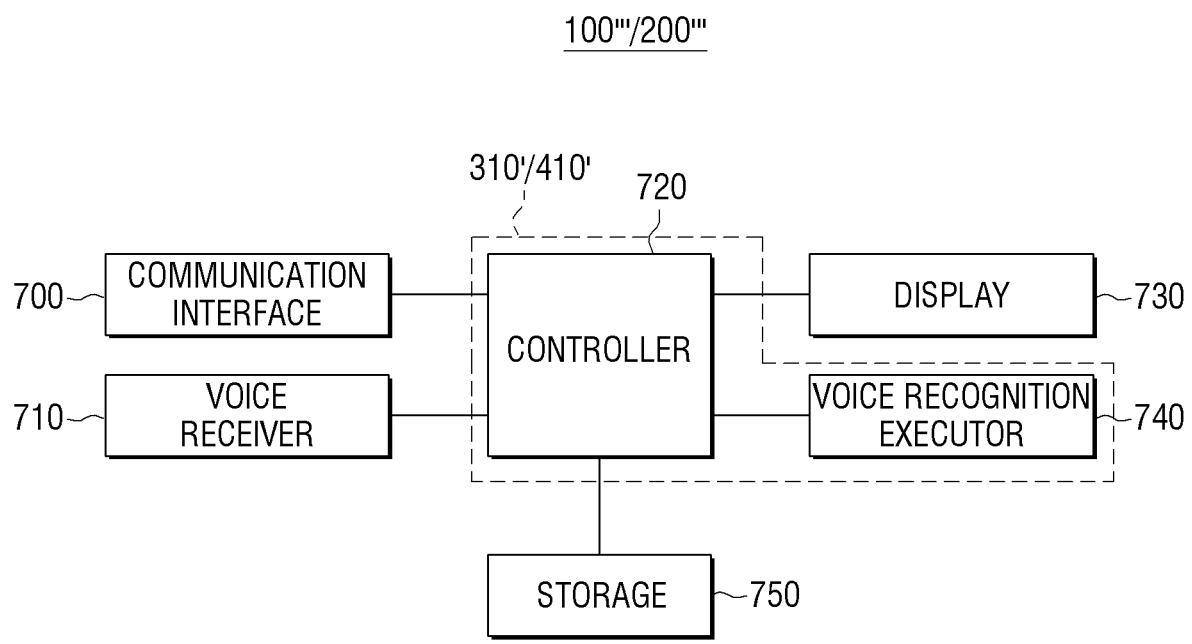
FIG. 7 is a block diagram illustrating another example of a detailed configuration of a voice recognition apparatus of FIG. 1 or a user device of FIG. 2.

FIG. 7 is a block diagram illustrating another example of a detailed configuration of a voice recognition apparatus 100''' of FIG. 1 or a user device 200''' of FIG. 2.

For convenience of description, with reference to FIG. 7 in addition to FIG. 2, the user device 200''' according to another exemplary embodiment may include some or all of a communication interface 700, a voice receiver 710, a controller 720, a display 730, a voice recognition executor 740, and a storage 750.

The user device 200''' of FIG. 7 includes a voice recognizer therein but when a preset condition is satisfied, the user device 200''' may transmit audio data of user voice to the voice recognition apparatus 220 of FIG. 2 through the communication interface 700. In addition, the user device 200''' may receive a recognition result of the transmitted audio data through the communication interface 700. In this case, during transmission of the audio data, the user device 200''' may detect only a period determined as user voice from the voice signal received by the voice receiver 710 and transmit the period.

For example, the voice recognition executor 740 of the user device 200''' may include a trigger recognizer. When the trigger recognizer is executed and a voice uttered by a user is successfully recognized, the controller 720 may execute the voice recognizer such as "*-Voice" stored in the storage 750 or the voice recognition executor 740 and display a UI window indicating that the voice recognizer is activated on the display 730 in order to perform the regular voice recognizing operation.

In other words, when the user device 200 is a TV, the user may utter "Hi TV" in order to indicate starting of the voice recognizing operation, and the user device 200 may execute and recognize the trigger recognizer installed therein and, then, when recognition is successful, the voice recognizer such as "*-Voice" may be executed. Then, when the user utters "How's today's weather?", a text-based recognition result may be acquired through the voice recognizer such as "*-Voice" and a search operation may be performed based on the acquired text-based recognition result.

Except for this point, the voice receiver 710, the controller 720, the display 730, the voice recognition executor 740, and the storage 750 of FIG. 7 are not largely different from the description of FIGS. 4 and 5 and, thus, the detailed description of the voice receiver 710, the controller 720, the display 730, the voice recognition executor 740, and the storage 750 will replace those of FIGS. 4 and 5.

Figure 8:
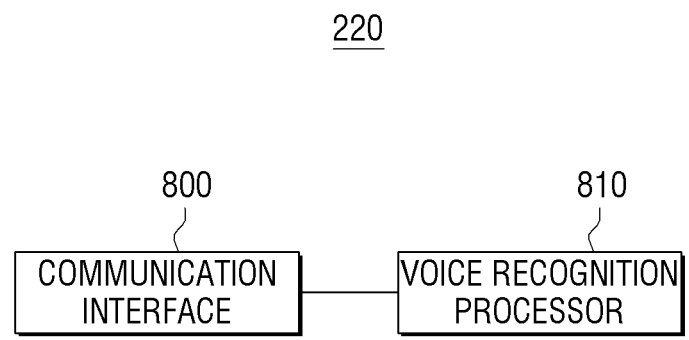
FIG. 8 is a block diagram illustrating a configuration of the voice recognition apparatus of FIG. 2.

FIG. 8 is a block diagram illustrating a configuration of the voice recognition apparatus 220 of FIG. 2.

As illustrated in FIG. 8, the voice recognition apparatus 220 of FIG. 2 according to an exemplary embodiment may include a communication interface 800 and a voice recognition processor 810.

The communication interface 800 includes a server-based voice recognizer connected to the communication network 210 and, thus, may receive audio data of a voice uttered by the user from the user device 200 of FIG. 2. In addition, the communication interface 800 may transmit a recognition result of the received voice to the user device 200 under control of the voice recognition processor 810.

The voice recognition processor 810 may include various types of voice recognizers. Needless to say, the voice recognizer may adaptively operate with respect to a user and a surrounding environment thereof, as described above. For example, the voice recognition processor 810 may include a trigger recognizer for recognition of a trigger word and a voice recognizer such as "*-Voice" related to a regular voice recognition operation. In general, it may be advantageous that a voice recognizer of a server end has better performance than the voice recognizer of the user device 200. In addition, in consideration of expense and so on of the user device 200, a general voice recognizer may be included in the voice recognition processor 810 of the server end. However, an exemplary embodiment is not particularly limited to the above description.

Except for this point, the voice recognition processor 810 of FIG. 8 is not largely different from the voice recognition processor 310 of FIG. 3 and, thus the detailed description of the voice recognition processor 310 will replace those of the voice recognition processor 810.

Figure 9:
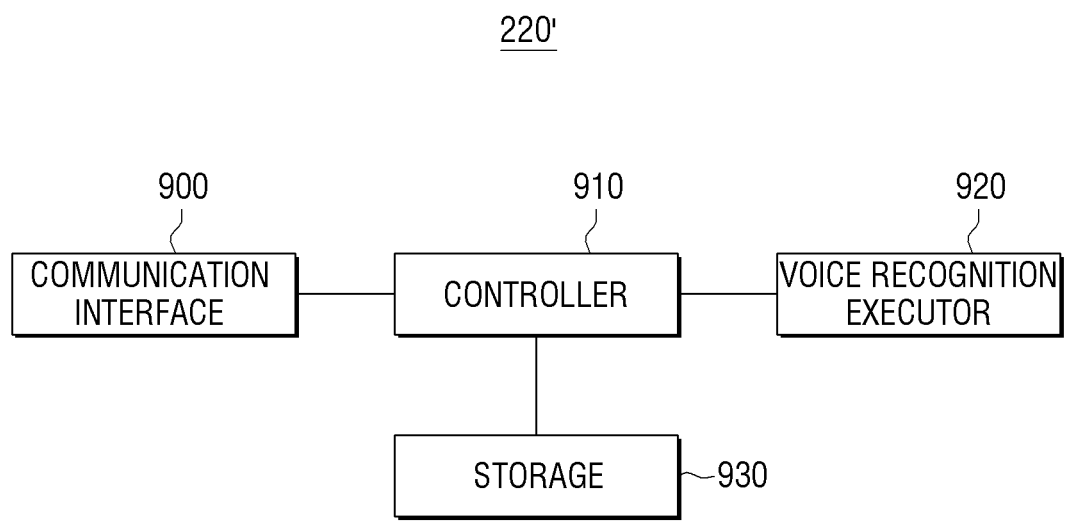
FIG. 9 is a block diagram illustrating an example of another configuration of a voice recognition apparatus illustrated in FIG. 2.

FIG. 9 is a block diagram illustrating an example of another configuration of a voice recognition apparatus 220' illustrated in FIG. 2.

As illustrated in FIG. 9, the voice recognition apparatus 220' according to another exemplary embodiment may include some or all of a communication interface 900, a controller 910, a voice recognition executor 920, and a storage 930, and here, inclusion of some or all of components is the same as the aforementioned meaning.

The voice recognition processor 810 of FIG. 8 may be divided into the controller 910 for performing a control function and the voice recognition executor 920 for performing a voice recognition operation to output a recognition result. The voice recognition executor 920 may be configured in the form of EEPROM, and it may be possible that a voice recognizer (an engine or a program) included therein is updated through an externally connected device.

Here, the controller 910 may include some or all of the processor 600 and the memory 610 which have been described with reference to FIG. 6, which has been sufficiently described above with reference to FIG. 5 and, thus, will not be described below.

The controller 910 and the voice recognition executor 920 of FIG. 9 have been sufficiently described above with reference to FIGS. 5 and 6 and, thus, a description of the controller 910 and the voice recognition executor 920 will replace the description of FIGS. 5 and 6.

Figure 10:
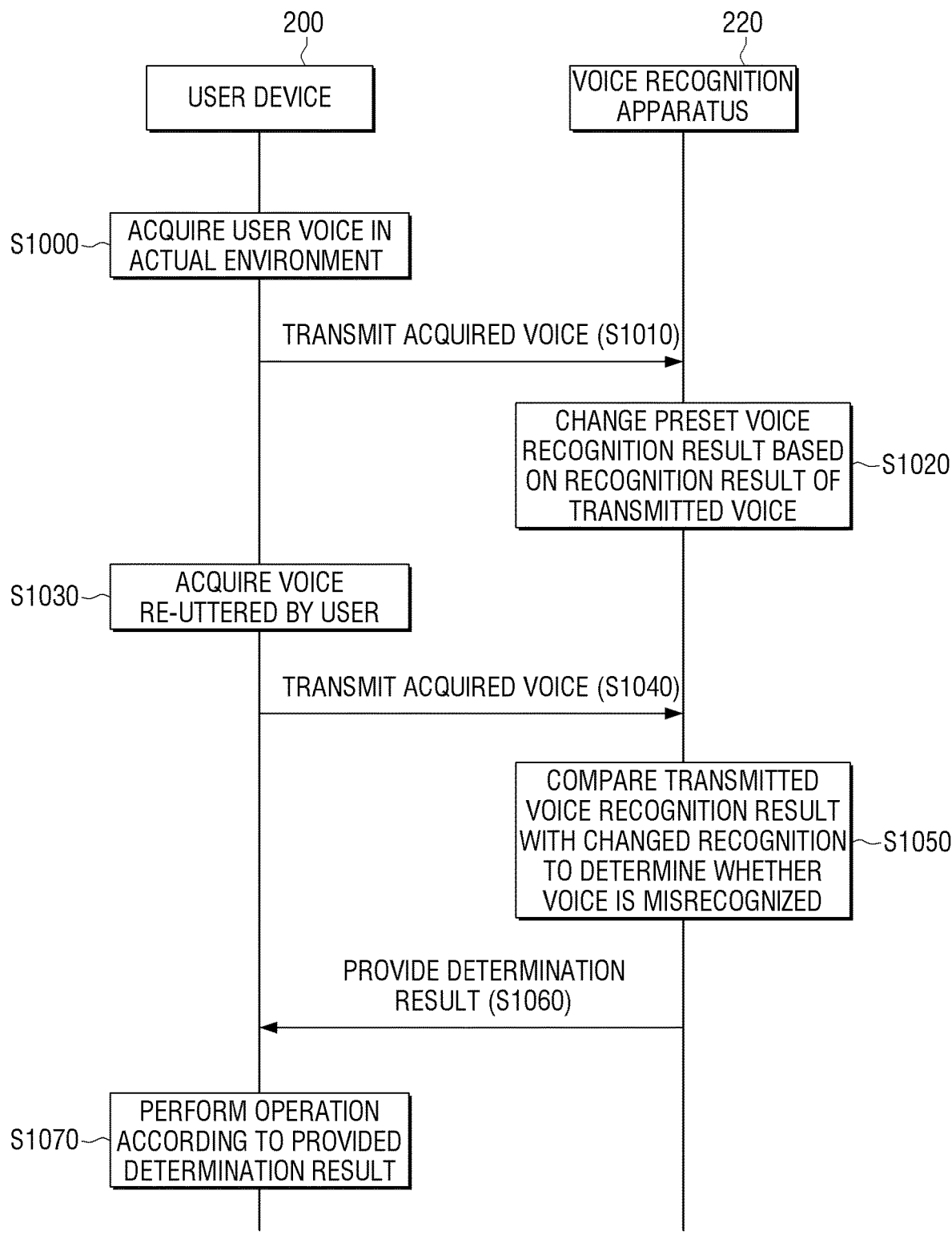
FIG. 10 is a diagram illustrating another voice recognition procedure according to an exemplary embodiment.

FIG. 10 is a diagram illustrating another voice recognition procedure according to a first embodiment.

FIG. 10 illustrates a scenario in which the user device 200 of FIG. 2 does not include a voice recognizer. The user device 200 may acquire a user voice in an actual environment (operation S1000). Here, the "actual environment" may be interpreted as users, i.e., family members who use the user device 200 or a surrounding environment of the user device 200.

The user device 200 may transmit audio data of a user voice acquired through a sound pickup device is operatively associated with an internally installed microphone or an external source in the form of stand-alone to the voice recognition apparatus 220 based on a server (operation S1010). According to an exemplary embodiment, the user device 200 may adaptively operate with respect to a user and a surrounding environment thereof of the user device 200 put in the actual environment and, thus, this procedure may be actually performed several times.

The voice recognition apparatus 220 may change a preset voice recognition result based on a recognition result of a voice transmitted from the user device 200 (operation S1020). When the voice recognition apparatus 220 includes, for example, a voice recognizer of a captive firing engine, the voice recognition apparatus 220 may change the threshold value of the similarity score. For example, when the threshold value of the similarity score of the preset recognition result is 94%, if the similarity score of the recognition result of the transmitted voice is 94% or more, the voice recognition apparatus 220 may determine that recognition is successful, and when the threshold value of the similarity score of the preset recognition result is changed to be lowered to 93%, if the similarity score of the recognition result of the transmitted voice is 93% or more, the voice recognition apparatus 220 may determine that recognition is successful.

As such, when the speaker characteristics are applied to adjust the threshold value, the voice recognition apparatus 220 may misrecognize a surrounding environment in which the user device 200 is input, i.e., surrounding noise other than a user such that the user device 200 malfunctions.

Accordingly, in order to more accurately determine this procedure, the voice recognition apparatus 220 may receive a voice re-uttered by the user (operations S1030 and S1040) and compare a recognition result of the voice with a changed recognition result to determine whether the voice is misrecognized (operation S1050)

As the determination result, when recognition is successful and a recognition rate is not degraded, the threshold value may be determined to be appropriately corrected, and the voice recognition apparatus 220 may transmit the corresponding recognition result to the user device 200 so as to perform an appropriate operation. For example, when recognition of a trigger word is successful, the user device 200 may execute another voice recognizer for regularly performing a voice recognition operation.

Then, the voice recognition apparatus 220 may store information on the corresponding recognition result as a speaker model. In addition, the voice recognition apparatus 220 may update information on the successfully recognized speaker model. On the other hand, the failed recognition result based on the changed threshold value may be determined as information on a background, i.e., a use environment other than the user and may be separately stored from the speaker model.

The stored speaker model information and background model information may be referred to readjust the threshold value as a result of voice recognition based on the changed voice recognition result, for example, when a preset condition is satisfied. Here, the "preset condition" includes the case in which a recognition rate is degraded. In reality, audio data corresponding to a voice period of the user may include speaker characteristics and background characteristics of a surrounding environment. In this case, the background characteristics may be variously changed and, thus, absolutely different speaker model information may be generated during analysis of the audio data, thereby increasing misrecognition rate. In order to overcome this problem, according to an exemplary embodiment, a readjustment operation of a threshold value may be performed.

Figure 11:
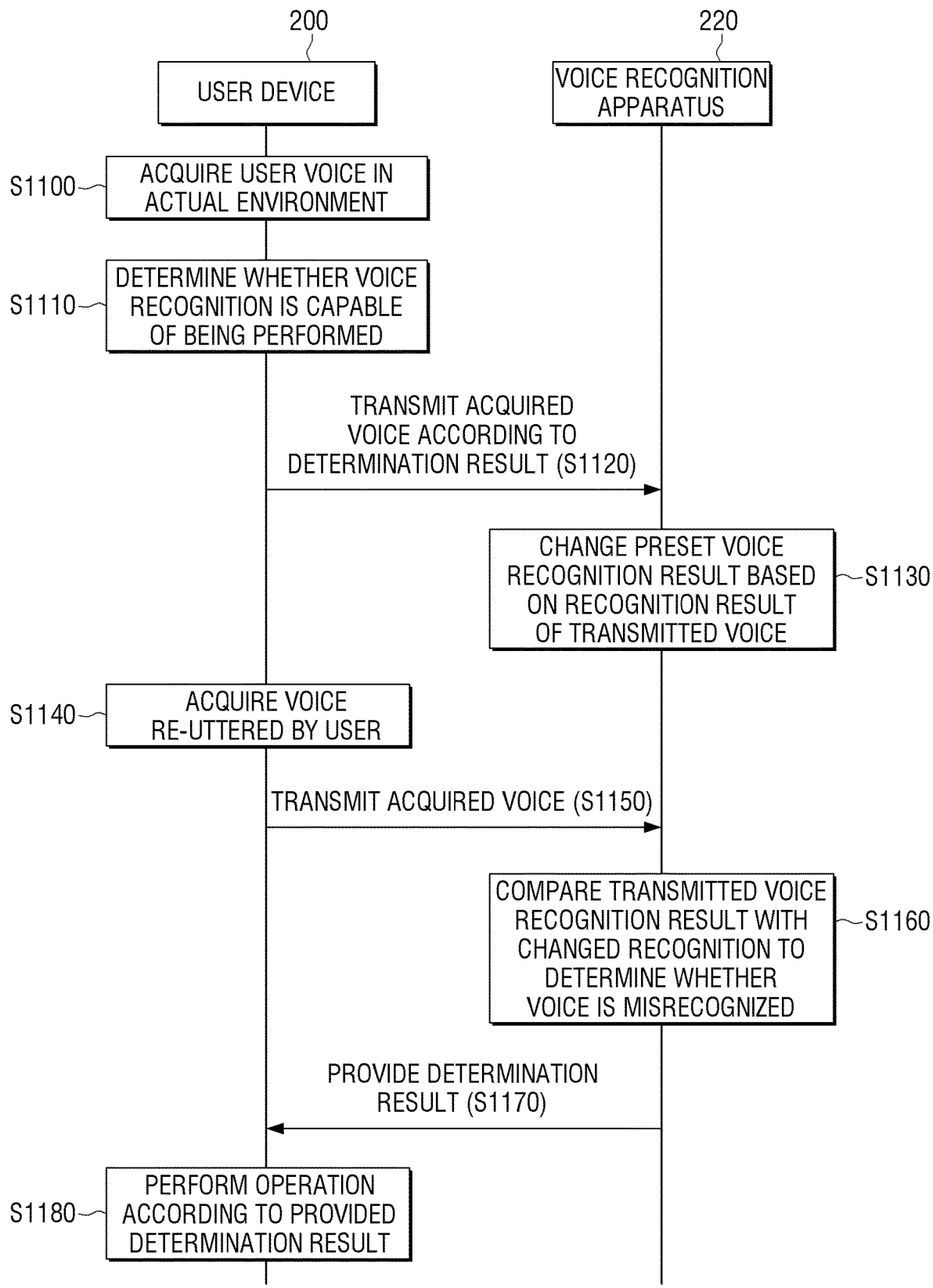
FIG. 11 is a diagram illustrating a voice recognition procedure according to another exemplary embodiment.

FIG. 11 is a diagram illustrating a voice recognition procedure according to another exemplary embodiment.

FIG. 11 illustrates a case in which the user device 200 includes a voice recognizer installed therein according to another exemplary embodiment. The user device 200 may determine whether voice recognition is capable of being performed using the internal voice recognizer (operations S1100 and S1110) and transmit acquired audio data of a voice to the voice recognition apparatus 220 (operation S1120).

For example, when a portion corresponding to a voice period is detected from a received signal and a time period in which the detected portion is uttered is short like a trigger word, the user device 200 may determine the portion as a trigger word and process the portion.

Except for this point, operations S1130 to S1170 of FIG. 11 are not largely different from operations S1020 to S1070 of FIG. 10 and, thus, the detailed description of operations S1020 to S1070 will replace those of S1130 to S1170.

Figure 12:
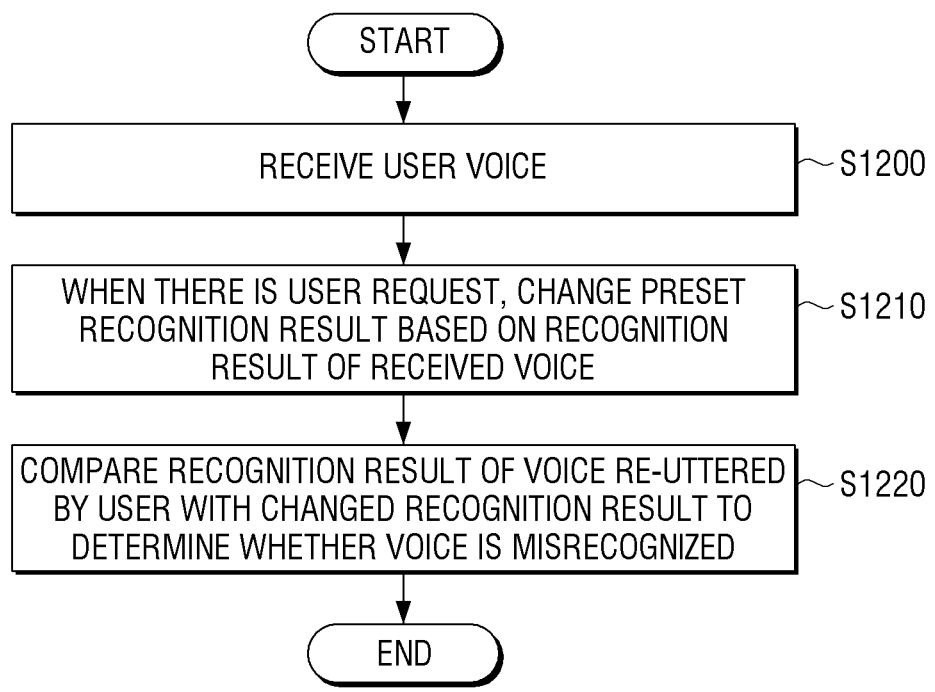
FIG. 12 is a flowchart illustrating a voice recognition procedure according to an exemplary embodiment.

FIG. 12 is a flowchart illustrating a voice recognition procedure according to an exemplary embodiment.

For convenience of description, with reference to FIG. 12 in addition to FIG. 1, the voice recognition apparatus 100 according to an exemplary embodiment may receive a voice uttered by a user (operation S1200).

Here, the voice may refer to a user voice. Accordingly, in greater detail, the voice recognition apparatus 100 may receive a signal (or a sound) including noise other than the user voice through, for example, a microphone and detect a voice period corresponding to the user voice from the received signal.

The voice recognition apparatus 100 may execute an "actual environment adaptive mode" used in an exemplary embodiment according to, e.g., a user request. This may be performed through a menu image or through a separate button included in a remote controller.

When there is the user request, the voice recognition apparatus 100 may change a preset recognition result based on a voice recognition result (operation S1210). More particularly, a threshold value of a similarity score of the recognition result may be deemed to be changed.

In addition, when the user re-utters a voice command, the voice recognition apparatus 100 may determine whether a recognition result of the re-uttered voice is greater than or equal to the changed threshold value to determine whether misrecognition occurs (operation S1220).

When recognition is successful, another voice recognizer such as "*-Voice" may be driven based on the success result. During this procedure, the voice recognition apparatus 100 may separately store a corresponding text recognition result as speaker model information, and when recognition fails, the voice recognition apparatus 100 may separately store the corresponding text recognition result as background model information.

The stored speaker model and background model information may be referred when the threshold value of the similarity score needs to be re-adjusted.

Figure 13:
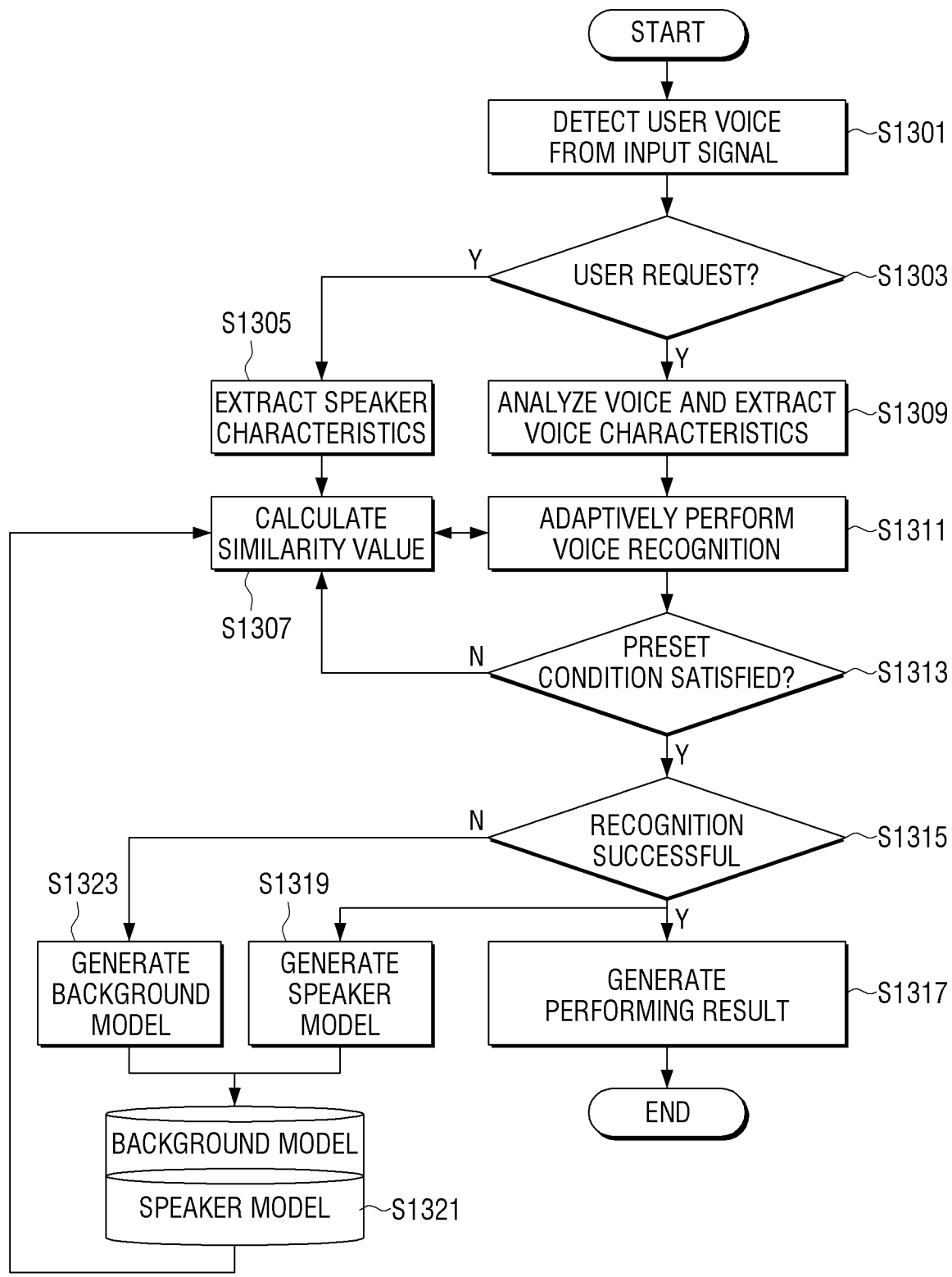
FIG. 13 is a flowchart of a voice recognition procedure according to another exemplary embodiment.

FIG. 13 is a flowchart of a voice recognition procedure according to another exemplary embodiment.

For convenience of description, with reference to FIG. 13 in addition to FIG. 1, the voice recognition apparatus 100 according to an exemplary embodiment may detect a user voice from an input signal (operation S1301).

When there is no execution request from the user according to a so-called "actual environment adaptive mode", the voice recognition apparatus 100 may perform a recognition operation according to a preset recognition result (operations S1303 to S1317).

When the user issues a request for adapting the voice recognition apparatus 100 to an actual environment in operation S1303, the voice recognition apparatus 100 may extract speaker characteristics of the received user voice (operation S1305). In other words, when text-based information of a preset recognition result is 8-bit information "10101010", the text-based information of the speaker characteristics may be "10101011".

The voice recognition apparatus 100 may calculate a similarity value based on the speaker characteristics information. In other words, a degree by which the extracted speaker characteristics information is similar to a preset text-based recognition result. In addition, a threshold value of the calculated similarity value may be adapted to the preset recognition result (operation S1307). That is, the recognition result may be applied to change the threshold value of the similarity score.

Then, when the user re-utters a voice, the voice recognition apparatus 100 may apply the changed threshold value and may continuously perform operations S1301 to S1317.

During this procedure, when recognition is successful in operation S1315, the voice recognition apparatus 100 may store the successfully recognized text-based recognition result as a speaker model (operations S1319 and S1321) and then may periodically update the result. On the other hand, when recognition fails in operation S1315, the voice recognition apparatus 100 may store the failed text-based recognition result as a background model (operations S1323 and S1321).

In addition, when an event in which a preset condition is satisfied occurs, for example, when a recognition rate is degraded during a recognition operation (operation S1313), the voice recognition apparatus 100 may analyze a received voice signal to re-analyze speaker characteristics (operation S1305) and re-calculate the threshold value of the similarity score with reference to the speaker model information and the background model information, which are separately stored during the above procedure so as to re-adjust the changed threshold value (operations S1307 and S1311).

According to the above method, the voice recognition apparatus 100 may adaptively operate to an actual environment so as to prevent unintended misrecognition.

FIG. 14 is a flowchart of a voice recognition procedure according to another exemplary embodiment.

For convenience of description, with reference to FIG. 14 in addition to FIG. 1, the voice recognition apparatus 100 according to an exemplary embodiment may receive a voice signal of a voice uttered by a user (operation S1400).

In addition, the voice recognition apparatus 100 recognizes a voice recognition starting word from the received voice signal, and when a recognition result of the starting word is greater than or equal to a preset threshold value, the voice recognition apparatus 100 may perform voice recognition on the voice signal (operation S1410). Here, the preset threshold value may refer to a threshold value of the similarity score.

In addition, the voice recognition apparatus 100 may adjust a preset threshold value based on the recognition result of the starting word (operation S1420). For example, when there is a user command for adaptively operating the voice recognition apparatus 100 to an actual environment, the voice recognition apparatus 100 may adjust the preset threshold value based on the recognition result of the starting word received after the command.

Although all elements constituting the embodiments are described as integrated into a single one or to be operated as a single one, the present exemplary embodiment is not necessarily limited thereto. According to embodiments, all of the elements may be selectively integrated into one or more and be operated as one or more within the object and the scope. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily understood by those skilled in the art to which the present exemplary embodiment pertains. The computer program may be stored in non-transitory computer readable media such that the computer program is read and executed by a computer to implement embodiments.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a bluray disc, a universal serial bus (USB), a memory card, a read only memory (ROM), and the like, and may be provided.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A voice recognition apparatus comprising:
   a storage configured to store a trigger word and a predetermined threshold value for enabling voice recognition;
   a voice receiver; and
   a voice recognition processor configured to:
     based on receiving a first voice signal through the voice receiver, recognize a voice recognition starting word included in the first voice signal based on a similarity score between the voice recognition starting word contained in the first voice signal and the trigger word stored in the storage, and
     based on the similarity score being greater than or equal to the predetermined threshold value, recognize a control word included in the first voice signal and perform an operation corresponding to the control word,
   based on receiving a second voice signal which is different from the first voice signal through the voice receiver, recognize a voice recognition starting word included in the second voice signal based on a similarity score between the voice recognition starting word included in the second voice signal and the trigger word stored in the storage, and
   wherein the voice recognition processor is further configured to:
   based on the voice recognition of each of the first voice signal and the second voice signal being successful based on the predetermined threshold value, control the storage to store each of recognition results as a first recognition model,
   based on the voice recognition of each of the first voice signal and the second voice signal being failed based on the predetermined threshold value, control the storage to store each of recognition results as a second recognition model,
   based on a predetermined event, change the predetermined threshold value based on the first recognition model and the second recognition model, and
   perform a voice recognition operation based on the changed predetermined threshold value,
   wherein the predetermined event is at least one of an event that a number of the stored recognition results is equal to or greater than a predetermined number or an event that a failure rate of the voice recognition is increased.

2. The voice recognition apparatus as claimed in claim 1, wherein the voice recognition processor is further configured to obtain the similarity score based on a text-based recognition result of the voice recognition starting word.

3. The voice recognition apparatus as claimed in claim 1, wherein the voice recognition processor is further configured to re-change the changed predetermined threshold value when a misrecognition rate is increased as a result of the voice recognition based on the changed predetermined threshold value.

4. The voice recognition apparatus as claimed in claim 1, further comprising an isolated word voice recognizer configured to recognize the voice recognition starting word.

5. A voice recognition method comprising:
storing a trigger word and a predetermined threshold value for enabling voice recognition;
receiving a first voice signal;
based on receiving a first voice signal through a voice receiver, recognizing a voice recognition starting word contained in the first voice signal based on a similarity score between the voice recognition starting word contained in the first voice signal and the stored trigger word;
based on the similarity score being greater than or equal to the predetermined threshold value, recognizing a control word included in the first voice signal and performing an operation of the voice recognition corresponding to the control word;
based on receiving a second voice signal which is different from the first voice signal, recognize a voice recognition starting word included in the second voice signal based on a similarity score between the voice recognition starting word included in the second voice signal and the stored trigger word;
based on the voice recognition of each of the first voice signal and the second voice signal being successful based on the predetermined threshold value, controlling a storage to store each of recognition results as a first recognition model;
based on the voice recognition of each of the first voice signal and the second voice signal being failed based on the predetermined threshold value, controlling the storage to store each of recognition results as a second recognition model; and
based on a predetermined event, changing the predetermined threshold value based on the first recognition model and the second recognition model; and
performing a voice recognition operation based on the changed predetermined threshold value,
wherein the predetermined event is at least one of an event that a number of the stored recognition results is equal to or greater than a predetermined number or an event that a failure rate of the voice recognition is increased.

6. The voice recognition method as claimed in claim 5, wherein the similarity score is obtained from a text-based recognition result of the voice recognition starting word.

7. The voice recognition method as claimed in claim 5, further comprising recognizing the voice recognition starting word by an isolated word voice recognizer installed in a user device.

8. The voice recognition method as claimed in claim 5, further comprising re-changing the changed predetermined threshold value when a misrecognition rate is increased as a result of the voice recognition based on the changed predetermined threshold value.

9. A non-transitory computer readable storage medium storing a program that is executable by a computer to perform a voice recognition method, the method comprising:
storing a trigger word and a predetermined threshold value for enabling voice recognition;
receiving a first voice signal;
based on receiving a first voice signal through a voice receiver, recognizing a voice recognition starting word contained in the first voice signal based on a similarity score between the voice recognition starting word contained in the first voice signal and the stored trigger word;
enabling an operation of the voice recognition on the second voice signal in response to the similarity score being greater than or equal to the predetermined threshold value;
based on the similarity score being greater than or equal to the predetermined threshold value, recognizing a control word included in the first voice signal and performing an operation of the voice recognition corresponding to the control word;
based on receiving a second voice signal which is different from the first voice signal, recognize a voice recognition starting word included in the second voice signal based on a similarity score between the voice recognition starting word included in the second voice signal and the stored trigger word;
based on the voice recognition of each of the first voice signal and the second voice signal being successful based on the predetermined threshold value, controlling the storage to store each of recognition results as a first recognition model;
based on the voice recognition of each of the first voice signal and the second voice signal being failed based on the predetermined threshold value, controlling the storage to store each of recognition results as a second recognition model; and
based on a predetermined event, changing the predetermined threshold value based on the first recognition model and the second recognition model,
wherein the predetermined event is at least one of an event that a number of the stored recognition results is equal to or greater than a predetermined number or an event that a failure rate of the voice recognition is increased.

* * * * *